United States Patent [19]

Spietschka et al.

[11] 4,431,806
[45] Feb. 14, 1984

[54] PROCESS FOR THE PREPARATION OF PIGMENTS OF THE PERYLENE-3,4,9,10-TETRACARBOXYLIC ACID DIIMIDE SERIES, AND THEIR USE

[75] Inventors: Ernst Spietschka, Idstein; Manfred Urban, Wiesbaden, both of Fed. Rep. of Germany

[73] Assignee: Hoechst A.G., Frankfurt am Main, Fed. Rep. of Germany

[21] Appl. No.: 261,927

[22] Filed: May 8, 1981

[30] Foreign Application Priority Data

May 10, 1980 [DE] Fed. Rep. of Germany ....... 3018006

[51] Int. Cl.³ .................... C07D 471/06; C09B 3/14; C09B 67/00
[52] U.S. Cl. .................................. 546/37; 8/657; 106/287.21; 106/288 Q
[58] Field of Search .......................... 546/37

[56] References Cited

U.S. PATENT DOCUMENTS

| | | | |
|---|---|---|---|
| 3,615,800 | 10/1971 | Spietschka et al. | 546/37 |
| 3,976,649 | 8/1976 | Fabian | 546/37 |
| 4,018,791 | 4/1977 | Spietschka et al. | 546/37 |

OTHER PUBLICATIONS

Spietschka et al., Chem. Abs. 83, 99711 (1975).

*Primary Examiner*—Mark L. Berch
*Attorney, Agent, or Firm*—Curtis, Morris & Safford

[57] ABSTRACT

Very pure, transparent pigments of high color strength, of the formula

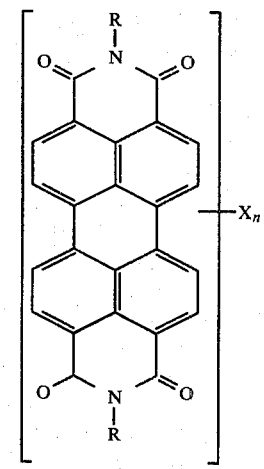

in which R is hydrogen or alkyl having 1 to 4 C atoms, X is chlorine and/or bromine and n is a number from 0 to 4 are obtained by converting the corresponding crude pigment to the sulfate, isolating the sulfate, liberating the pure product from the sulfate by hydrolysis, separating off the pure product and dry milling the anhydrous material, with or without additives and with or without subsequent solvent finishing. These pigments are suitable for coloring paints and plastic compositions, especially for pigmenting metallic paints.

7 Claims, No Drawings

PROCESS FOR THE PREPARATION OF PIGMENTS OF THE PERYLENE-3,4,9,10-TETRACARBOXYLIC ACID DIIMIDE SERIES, AND THEIR USE

German Offenlegungsschrift No. 2,360,792 discloses a process for the preparation of very pure pigments, wherein the crude pigments are converted, by means of sulfuric acid, to the sulfates, the latter are isolated, and the pure product is liberated therefrom by hydrolysis, separated off and milled in a liquid medium. Suitable pigments for this process include perylenetetracarboxylic acid diimides, also referred to for brevity as "perylimides." The publication also mentions that it is possible, when using organic liquids as the milling medium, to displace the water, adhering to the filter cake, before starting the milling, and to effect the process of fine division in an anhydrous medium. The milling can, where appropriate, be carried out with addition of substances which themselves improve the properties of the milled pigment and therefore do not have to be removed, for example cationic, anionic or neutral surface-active substances. In particular cases, the pigment paste obtained on milling can be after-treated by heating with water and/or with water-miscible or water-immiscible liquids.

The wet milling of perylene-3,4,9,10-tetracarboxylic acid diimide, which has been purified via the sulfate, is also described in German Offenlegungsschrift No. 1,619,531.

German Offenlegungsschrift No. 2,316,536 discloses that perylene-3,4,9,10-tetracarboxylic acid diimides and their N-alkyl derivatives, which possess 1 to 4 C atoms per alkyl, can be prepared in a pigmentary form by milling the dry crude pigment; the latter is milled in the presence or absence of milling auxiliaries until the mean primary particle size is less than or equal to 0.05 μm, and the milled material is then treated with amines, low-molecular water-soluble aliphatic carboxylic acid amides, mixtures of these, or 75–84 percent strength by weight sulfuric acid, after which the product is separated from the treatment medium in a manner known per se. In this process, the aim is to achieve, by milling, the greatest possible comminution of the primary particles, until the X-ray bands become flattened, but nothing is stated concerning the primary particles of the crude pigment.

The invention relates to a process for the preparation of pigments of the general formula

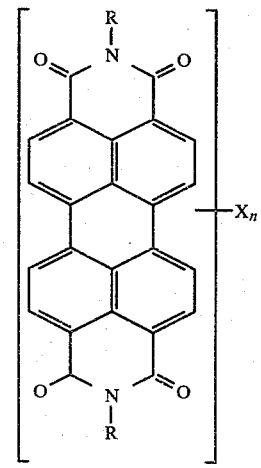

in which R is hydrogen or alkyl having 1 to 4 C atoms, X is chlorine and/or bromine and n is a number from 0 to 4, by converting the corresponding crude pigment to the sulfate, isolating the sulfate, liberating the pure product from the sulfate by hydrolysis, separating off the pure product and milling the anhydrous material, with or without additives and with or without subsequent solvent finishing, wherein the pure product is milled dry.

The pigments obtained according to the invention are distinguished by extremely high transparency and color strength, purity of color shade and satisfactory rheological behavior, and are therefore of importance for paints, especially for metallic finishes. Furthermore, they are outstandingly suitable for coloring plastic compositions, for example for the spin-dyeing of organic fiber materials. Accordingly, the invention also relates to the use of the pigments, obtained according to the invention, for coloring paints and plastic compositions.

Crude pigments, which arise from the conventional syntheses, for example by alkali fusion of naphthalimides or alkylation of perylimide, serve as the starting material.

In the purification process according to German Offenlegungsschrift No. 2,360,792, a highly crystalline, pure sulfate is first isolated, from which a "pre-pigment" having very small primary particles is obtained by hydrolysis. As is shown by the X-ray spectrum (with Cu K$_\alpha$-radiation), the pure products which have been subjected to milling exhibit a very high crystallinity and in some cases a strong texture, due to the very good crystallinity, but already have very small primary particles. In contrast, the crude pigments employed according to German Offenlegungsschrift No. 2,316,536 exhibit only moderate crystallinity in the X-ray spectrum. Accordingly, in the process according to the invention the object of milling is not to achieve primary particle comminution down to the amorphous region, but essentially is to expose, as far as possible, the primary particles which are present in the agglomerate during hydrolysis.

To achieve this object it is advantageous, but not essential in every case, to add, during the milling stage, additives (milling auxiliaries) which minimize re-agglomeration during milling. It is particularly advantageous to use milling auxiliaries which, after working up, can remain in the pigment, for example surface-active substances. Salts of fatty acids, and resins and their salts, which can, if required, be converted into the free acids after milling, have proved particularly suitable.

It is also possible to add, during milling, the usual inorganic salts, for example sodium chloride or sodium sulfate.

The de-agglomeration more or less extensively achieved during milling can, depending on the end use of the product, be followed by solvent finishing in order to achieve a high pigment quality. The finishing media customary for this purpose are suitable, in particular polar, solvents such as aqueous sulfuric acid, but especially polar organic solvents such as dioxane, chlorobenzene, nitrobenzene, morpholine, pyridine, quinoline, tetramethylenesulfone (sulfolane), dimethylsulfoxide, N-methylacetamide, dimethylformamide or N-methylpyrrolidone.

The pigments thus obtained are very easily dispersible in the application media and give pigmentations having exceptionally high transparency and color strength, purity of color shade and high light-fastness and fastness to weathering. This combination of properties, especially the high transparency of the colorations, was not achievable with the known perylimide pigments.

The Examples which follow explain the invention in more detail. Percentage data are by weight. The term "perylimide" denotes perylene-3,4,9,10-tetracarboxylic acid diimide, which may or may not be substituted as stated.

EXAMPLE 1

(a) Preparation of the pure perylimide 50 g of crude perylimide are introduced into 1,000 g of concentrated sulfuric acid at room temperature and dissolved by warming to 60° C. 375 g of 50% strength sulfuric acid are added dropwise to the solution in the course of one hour, taking care that the temperature does not rise above 100° C. The crystal suspension obtained is allowed to cool to room temperature and the crystalline sulfate is filtered off and washed in portions with a total of 350 g of 82.7% strength sulfuric acid. The filter residue is then washed with water until the filtrate reacts neutral, and is dried. 44 g of pure perylimide are obtained.

(b) Milling 24 g of pure perylimide are milled for 12 hours with 6 g of an alcohol-soluble fumaric acid/colophony resin (D 1.15, acid number 110 to 130, color number 30) and 1,575 g of "Cylpebs" (made from corundum, 12 mm diameter, manufactured by Groh GmbH, Hof) as milling bodies, in a 1 liter vibratory mill ("Vibratom" type, manufactured by Siebtechnik Mühlheim), having a milling insert made of polypropylene, and the milling bodies are then removed by sieving.

(c) Solvent finishing 250 g of N-methylpyrrolidone are initially placed in a stirred vessel, 25 g of milled material are introduced, while stirring, and the stirring is continued for 15 hours at room temperature. After addition of 200 ml of water, the mixture is warmed to 50° C. and stirred for 2 hours at this temperature, and the pigment is filtered off. The filter residue is washed free from N-methylpyrrolidone and is dried at 80° C. 24.5 g of a pigment which is outstandingly suitable for coloring paints and plastic compositions in brownish red shades are obtained.

A similar result is obtained if N-methylacetamide, dioxane, pyridine, morpholine or 80% strength sulfuric acid is used instead of N-methylpyrrolidone.

EXAMPLE 2

24 g of the pure perylimide obtained according to Example 1(a) are milled according to Example 1(b) but instead of the resin mentioned there 6 g of sodium laurate (containing 50% of sodium chloride) are employed.

25 g of the milled material thus obtained are introduced into a stirred vessel containing 125 g of dimethylformamide, and the mixture is stirred for a further 15 hours at room temperature. After addition of 125 ml of water, the mixture is warmed to 50° C. and is stirred for a further 2 hours at this temperature. Thereafter, 20 g of 18% strength hydrochloric acid are added dropwise, the mixture is stirred for a further hour at 50° C. and the pigment is filtered off, washed until neutral and dried at 80° C. 24 g of a pigment which is exceptionally suitable for coloring paints and plastic compositions, giving brownish red shades, are obtained.

EXAMPLE 3

(a) Preparation of the pure perylimide 50 g of crude perylimide are employed analogously to Example 1(a), but are introduced into only 250 g of concentrated sulfuric acid at room temperature. The mixture is warmed to 80° C. and stirred for 1 hour at this temperature, and 93.8 g of 50% strength sulfuric acid are added dropwise in the course of 1 hour, again at the same temperature. The process is thereafter carried out as stated in Example 1(a). 43.4 g of pure perylimide are obtained.

(b) Milling 24 g of the pure perylimide thus obtained are milled analogously to Example 1(b), but instead of the resin mentioned in the said example, 6 g of sodium stearate (containing 60% of sodium chloride) are employed.

(c) Solvent finishing 25 g of milled material are introduced, with stirring, into a stirred vessel containing 125 g of N-methylpyrrolidone, and the mixture is stirred for a further 15 hours at room temperature. It is then heated for 2 hours at 125° C. and allowed to cool to 50° C., and at the latter temperature 200 ml of methanol are added and 20 g of 18% strength hydrochloric acid are introduced dropwise. After a further hour's stirring at 50° C., the pigment is filtered off and washed with methanol. 22.8 g of a pigment which is outstandingly suitable for coloring paints and plastic compositions, giving brownish red shades, are obtained.

EXAMPLE 4

25 g of the milled material obtained according to Example 2 are introduced into a stirred vessel containing 125 g of nitrobenzene, and the mixture is stirred for 2 hours at 50° C. After having added 125 g of methanol, stirring is continued for a further 2 hours at 50° C., 20 g of 18% strength hydrochloric acid are added dropwise and stirring is continued for 1 hour at 50° C. The pigment is filtered off, washed with methanol and dried. 24 g of a pigment which is outstandingly suitable for coloring paints and plastic compositions, giving brownish red shades, are obtained.

Comparable results are obtained if chlorobenzene, quinoline, tetramethylenesulfone or dimethylsulfoxide is used in place of nitrobenzene.

EXAMPLE 5

(a) Preparation of the pure pigment 40 g of the pure perylimide obtained according to Example 1(a) are introduced into 1,200 g of 100% strength sulfuric acid at room temperature, 5 g of iodine are added, the mixture is warmed to 80°–90° C., and at this temperature 14 g of chlorine are introduced in the course of 6 hours. The mixture is allowed to cool to room temperature, 450 g of 50% strength sulfuric acid are added dropwise and the sulfate which has precipitated is filtered off and washed with 350 g of 78% strength sulfuric acid. Thereafter the filter residue is washed with water until the filtrate reacts neutral. 35.3 g of pure perylimide, having a chlorine content of 4.25%, are thus obtained.

(b) Milling

The chlorine-containing pure perylimide thus obtained is milled according to Example 2.

(c) Solvent finishing 25 g of milled material are introduced, with stirring, into a stirred vessel containing 250 g of N-methylpyrrolidone, and stirring is continued for 15 hours at room temperature. After having added 200 ml of water, the mixture is stirred for 2 hours at 50° C., 20 g of 18% strength hydrochloric acid are then added dropwise and stirring is continued for one hour at 50° C. After having been filtered off, the pigment is washed until neutral and is dried at 80° C. 21.9 g of a pigment are obtained; the product is somewhat darker and more transparent than the pigment obtained according to Example 1, and is exceptionally suitable for coloring paints and plastic compositions.

EXAMPLE 6

40 g of the pure perylimide obtained according to Example 1(a) are introduced into 1,200 g of 100% strength sulfuric acid at room temperature, and 5 g of iodine are added. The mixture is warmed to 80°–90° C. and at this temperature 42 g of chlorine are introduced in the course of 6 hours. The mixture is allowed to cool to room temperature, 800 g of 50% strength sulfuric acid are added dropwise and the sulfate which has precipitated is filtered off and washed with 350 g of 78% strength sulfuric acid. The residue is then washed with water, until the filtrate reacts neutral, giving 50.3 g of pure perylimide containing 23.5% of chlorine.

24 g of this pure perylimide are milled as described in Example 2 and after-treated according to Example 5(c). 23.6 g of a pigment which colors paints and plastic compositions in a red shade are obtained.

EXAMPLE 7

50 g of a pure perylimide obtained according to Example 1(a) are introduced into 900 g of 100% strength sulfuric acid at room temperature, 13.5 g of bromine are added and the mixture is stirred for 7 hours at 55° C. When it has cooled to room temperature, 495 g of 50% strength sulfuric acid are added dropwise and the sulfate which precipitates is filtered off and washed with 180 g of 78% strength sulfuric acid. The residue is washed with water until the filtrate reacts neutral, giving 29 g of pure perylimide containing 1.15% of bromine.

24 g of this pure perylimide are milled as stated in Example 2 and after-treated according to Example 5(c). 23.6 g of a pigment which is somewhat more yellowish than the product according to Example 1, and is exceptionally suitable for coloring paints and plastic compositions are obtained.

EXAMPLE 8

50 g of a pure perylimide obtained according to Example 1(a) are introduced into 1,500 g of 100% strength sulfuric acid at room temperature, 0.5 g of iodine and 20.5 g of bromine are added and the mixture is heated for 6 hours at 100° C. When it has cooled to 80° C., 1,000 g of 50% strength sulfuric acid are added dropwise and after cooling to room temperature the sulfate which has precipitated is filtered off, and washed first with 250 g of 78% strength sulfuric acid and then with water until the filtrate reacts neutral. 56.7 g of pure perylimide, containing 21.4% of bromine, are thus obtained.

The pure perylimide thus obtained is milled according to Example 2 and after-treated according to Example 5(c). 23.6 g of a pigment which colors paints and plastic compositions in a red shade are obtained.

EXAMPLE 9

50 g of pure perylimide, obtained according to Example 1(a), are introduced into 1,500 g of 100% strength sulfuric acid at room temperature, 1 g of iodine and 30 g of bromine are added and the mixture is stirred for 6 hours at 125° C. After cooling to 100° C., 1,000 g of 50% strength sulfuric acid are added dropwise, and after cooling to room temperature the sulfate which has precipitated is filtered off and washed first with 300 g of 78% strength sulfuric acid and then with water until the filtrate reacts neutral. This gives 66.4 g of pure perylimide, containing 28.6% of bromine.

The pure perylimide thus obtained is milled according to Example 2 and after-treated according to Example 5(c). 23.5 g of a pigment, which colors paints and plastic compositions in a red shade, are thus obtained.

EXAMPLE 10

30 g of the pure perylimide containing 21.4% of bromine (the product obtained according to Example 8) are introduced, at room temperature, into 900 g of 100% strength sulfuric acid, and dissolved therein. After addition of 1 g of iodine, 7 g of chlorine are introduced in the course of 6 hours at 80°–90° C., and 600 g of 50% strength sulfuric acid are subsequently added dropwise in the same temperature range. After the mixture has cooled to room temperature, the sulfate which has precipitated is filtered off and washed first with 350 g of 78% strength sulfuric acid and then with water until the filtrate reacts neutral. 29.7 g of a pure perylimide, having a bromine content of 19.9% and a chlorine content of 5.05%, are obtained.

The pure perylimide thus obtained is milled according to Example 2 and after-treated according to Example 5(c). 23.7 g of a pigment, which colors paints and plastic compositions in a red shade, are obtained.

EXAMPLE 11

(a) Preparation of the pure pigment 50 g crude dimethylperylimide (prepared according to German Offenlegungsschrift No. 2,726,682) are introduced into 2,000 g of concentrated sulfuric acid at room temperature and dissolved by warming to 60° C. 375 g of 50% strength sulfuric acid are then added dropwise in the course of one hour, taking care that the temperature does not rise above 100° C. When the mixture has cooled to room temperature, the sulfate which has precipitated is filtered off and washed first with 350 g of 82.7% strength sulfuric acid and then with water until the filtrate reacts neutral. After drying, 43 g of pure dimethylperylimide are obtained.

(b) Milling 10 g of the pure dimethylperylimide thus obtained are milled with 1 g of oleic acid monoethanolamide, 100 g of sodium sulfate and 3,720 g of steel balls (8 mm diameter) as milling bodies, in the vibratory mill described in Example 1, for 6 hours and the milled material is then separated from the milling bodies by sieving. To remove the sodium sulfate, the milled material is introduced into a stirred vessel which contains 1 liter of water, the mixture is stirred for one hour and the pigment is filtered off and washed until free from sulfate. 10.1 g of a pigment which is exceptionally suitable for coloring paints, especially air-drying paints, and plastic compositions, are obtained.

EXAMPLE 12

37 g of crude dimethylperylimide containing 3.65% of chlorine (the product being prepared according to German Patent No. 441,587) are introduced into 1,110 g of concentrated sulfuric acid at room temperature, and dissolved therein. 1,110 g of 50% strength sulfuric acid are then added dropwise at room temperature and the sulfate which precipitates is filtered off at room temperature. The sulfate is washed first with 350 g of 78% strength sulfuric acid and then with water until the filtrate reacts neutral, and is dried. 35 g of pure dimethylperylimide, containing 3.65% of chlorine, are obtained.

The pure dimethylperylimide thus obtained is milled according to Example 2 and after-treated according to Example 2(c), but instead of dimethylformamide N-methylpyrrolidone is employed. 24 g of a pigment which colors paints and plastic compositions in a red shade are thus obtained.

We claim:

1. A process for the preparation of a perylene-3,4,9,10-tetracarboxylic acid diimide pigment of the formula

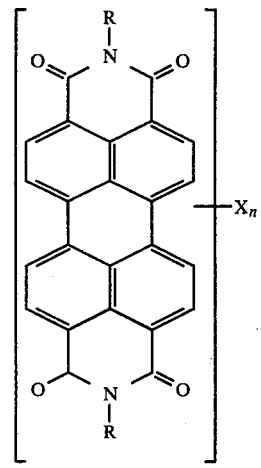

in which
R is hydrogen or alkyl of from 1 to 4 carbon atoms,
X is chlorine and/or bromine and n is a number of from 0 to 4, which comprises
converting the corresponding crude pigment to its sulfate,
isolating the sulfate,
hydrolyzing the sulfate to liberate therefrom the pure pigment,
separating off the pure pigment, and
dry-milling the pure pigment, in its anhydrous state, with or without one or more solid additives and with subsequent solvent finishing.

2. A process as claimed in claim 1, wherein the additive is a milling assistant which after working up can remain in the pigment.

3. A process as claimed in claim 1, wherein the additive is a surface-active substance.

4. A process as claimed in claim 3, wherein the additive is a fatty acid salt, a resin or a resin salt.

5. A process as claimed in claim 1, wherein the solvent finishing is carried out with a polar solvent.

6. A process as claimed in claim 1 or 5, wherein the solvent finishing is carried out with a polar organic solvent.

7. A process as claimed in claim 6, wherein the solvent finishing is carried out with N-methylpyrrolidone, dimethylformamide or nitrobenzene.

* * * * *